(12) United States Patent
Coleman et al.

(10) Patent No.: US 7,287,372 B2
(45) Date of Patent: Oct. 30, 2007

(54) EXHAUST AFTER-TREATMENT SYSTEM WITH IN-CYLINDER ADDITION OF UNBURNT HYDROCARBONS

(75) Inventors: Gerald N. Coleman, Corby (GB); Mary L. Kesse, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 74 days.

(21) Appl. No.: 11/159,903

(22) Filed: Jun. 23, 2005

(65) Prior Publication Data

US 2006/0288691 A1 Dec. 28, 2006

(51) Int. Cl.
*F01N 3/00* (2006.01)
*F01N 3/02* (2006.01)

(52) U.S. Cl. ............................ 60/286; 60/285; 60/297; 60/311

(58) Field of Classification Search .................. 60/285, 60/286, 297, 301, 311
See application file for complete search history.

(56) References Cited

U.S. PATENT DOCUMENTS

| | | | |
|---|---|---|---|
| 4,653,694 A * | 3/1987 | Noguchi et al. ....... | 239/533.12 |
| 5,626,115 A * | 5/1997 | Kawaguchi ................ | 123/305 |
| 6,047,542 A | 4/2000 | Kinugasa et al. | |
| 6,666,020 B2 * | 12/2003 | Tonetti et al. ................ | 60/286 |
| 6,742,328 B2 * | 6/2004 | Webb et al. .................. | 60/285 |
| 6,769,635 B2 * | 8/2004 | Stewart et al. .............. | 239/558 |
| 6,823,833 B2 * | 11/2004 | Ismailov ...................... | 123/299 |
| 6,843,055 B2 | 1/2005 | Ootake | |
| 7,055,494 B2 * | 6/2006 | Nishimaki ................... | 123/299 |
| 2006/0096275 A1 * | 5/2006 | Robel et al. ................... | 60/286 |
| 2006/0112928 A1 * | 6/2006 | Coleman et al. ............ | 123/305 |

* cited by examiner

*Primary Examiner*—Thomas Denion
*Assistant Examiner*—Loren Edwards
(74) *Attorney, Agent, or Firm*—Liell & McNeil (57) ABSTRACT

Certain exhaust after-treatment devices, at least periodically, require the addition of unburnt hydrocarbons in order to create reductant-rich exhaust conditions. The present disclosure adds unburnt hydrocarbons to exhaust from at least one combustion chamber by positioning, at least partially within a combustion chamber, a mixed-mode fuel injector operable to inject fuel into the combustion chamber in a first spray pattern with a small average angle relative to a centerline of the combustion chamber and a second spray pattern with a large average angle relative to the centerline of the combustion chamber. An amount of fuel is injected in the first spray pattern into a non-combustible environment within the at least one combustion chamber during at least one of an expansion stroke and exhaust stroke. The exhaust with the unburnt amount of fuel is moved into an exhaust passage via an exhaust valve.

9 Claims, 5 Drawing Sheets

EXHAUST AFTER-TREATMENT SYSTEM WITH IN-CYLINDER ADDITION OF UNBURNT HYDROCARBONS

U.S. GOVERNMENT RIGHTS

This disclosure was made with government support under the terms of Contract No. DE-FC05-97OR22605 awarded by the Department of Energy. The government may have certain rights in this invention.

TECHNICAL FIELD

The present disclosure relates generally to exhaust after-treatment systems, and more specifically to a method of adding unburnt hydrocarbons to the exhaust in after-treatment systems.

BACKGROUND

Certain diesel engine exhaust after-treatment systems require an addition of reductants, such as hydrocarbons, and/or elevated exhaust temperatures to chemically purge material that has been stored in an exhaust after-treatment device. For instance, a NOx adsorber catalytic converter, often referred to as a NOx trap, operates in two alternative phases: a storage phase and a regeneration phase. During the storage phase, the normal operation of an engine produces a reductant-lean exhaust in which the NOx is oxidized and stored on the NOx adsorber. During the regeneration phase, a reductant-rich exhaust is needed to de-store and convert the NOx into harmless gases. The regeneration phase generally lasts one to fifteen seconds. Similarly, another type of exhaust after-treatment device, being a particulate trap, traps particulates within exhaust flowing through the particulate trap. In order to regenerate the particulate trap, the temperature of the exhaust is raised via a chemical reaction requiring reductant-rich exhaust. The elevated-temperature exhaust with oxygen will be passed through the particulate trap, thereby burning the particulates trapped within the trap.

In order to create the reductant-rich environment and/or the elevated exhaust temperature for the regeneration of the NOx adsorber and particulate trap, additional diesel fuel is introduced into the exhaust. Often, the fuel is injected into the exhaust by an independent fuel injector downstream from the combustion chambers. Although the injection of the fuel creates the reductant-rich exhaust and the elevated exhaust temperatures needed for regeneration, the additional fuel injector increases the cost and complexity of the exhaust after-treatment system.

Moreover, it has been found that typical engine cylinder fuel injectors are incompatible with injecting the additional fuel into the exhaust prior to expelling the exhaust from the combustion chamber. Typical engine cylinder fuel injectors include nozzle outlets that are designed to inject fuel for combustion near top dead center of the engine piston. The injection of additional fuel through the typical engine cylinder fuel injectors after combustion and when the engine piston is closer to bottom dead center causes the fuel to contact the cylinder walls. The fuel can then dilute the lubricating oil, leading to engine malfunctions, such as piston seizure.

The present disclosure is directed at overcoming one or more of the problems set forth above.

SUMMARY OF THE INVENTION

In one aspect of the present disclosure, unburnt hydrocarbons are added to exhaust from at least one combustion chamber. A mixed-mode fuel injector is positioned to inject fuel in a first spray pattern with a small average angle relative to a centerline of the combustion chamber and a second spray pattern with a large average angle relative to the centerline of the combustion chamber. An amount of fuel is injected into a non-combustible environment within the at least one combustion chamber during at least one of an expansion stroke and an exhaust stroke. The exhaust with the unburnt additional amount of fuel is moved into an exhaust passage via an exhaust valve.

In another aspect of the present disclosure, an exhaust after-treatment device regeneration system includes at least one combustion chamber in which a piston reciprocates. At least one exhaust after treatment device is positioned within an exhaust passage fluidly connected to the combustion chamber. A fuel injector is operable to inject fuel in to the combustion chamber in a first spray pattern with a small average angle relative to a centerline of the combustion chamber and a second spray pattern with a large average angle relative to the centerline of the combustion chamber. The fuel injector is in communication with an electronic control module that includes a regeneration algorithm operable to signal the fuel injector to inject an amount of fuel in the first spray pattern during at least one of an expansion stroke and an exhaust stroke of at least one engine cycle within a regeneration phase of the exhaust after treatment device.

In still another aspect of the present disclosure, an article includes a computer readable data storage medium on which a regeneration algorithm is recorded. The regeneration algorithm is operable to signal at least one fuel injector to inject at least a first amount of fuel in at least one of a first spray pattern with a small average angle relative to a centerline of a combustion chamber and a second spray pattern with a large average angle relative to the centerline of the combustion chamber. The regeneration algorithm is also operable to signal the at least one fuel injector to inject an additional amount of fuel in the first spray pattern during at least one of an expansion stroke and an exhaust stroke of at least one engine cycle within a regeneration phase of the exhaust after-treatment device.

DETAILED DESCRIPTION

Figure 1:
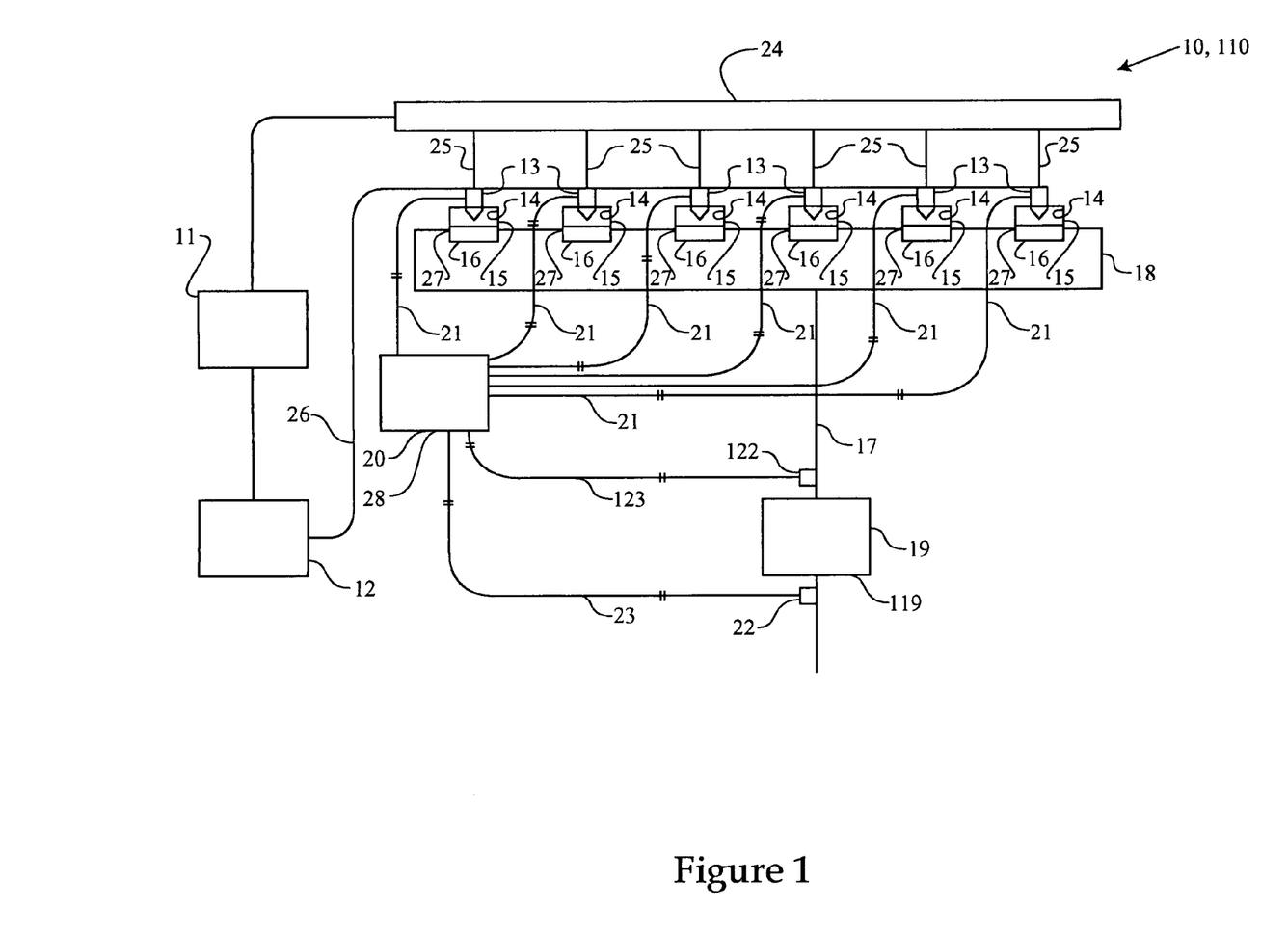
FIG. 1 is a schematic representation of an exhaust after-treatment device regeneration system, according a first and second embodiments of the present disclosure.

Referring to FIG. 1, there is shown a schematic representation of an exhaust after-treatment device regeneration system 10, according to a first and second embodiments of the present disclosure. The exhaust after-treatment device regeneration systems 10, 110 include at least one fuel pump 11 that is in fluid communication with a fuel tank 12 and a common rail 24. The fuel pump 11 draws fuel from the fuel tank 12, pressurizes the fuel and delivers the fuel to the common rail 24. The fuel pump 11 is generally in communication with an electronic control module 20 that controls the pressure output of the pump 24, and hence pressure in common rail 24, based on desired engine operation. The common rail 24 is in fluid communication with a plurality of mixed-mode fuel injectors 13 via a plurality of branch passages 25. Fuel not injected into combustion chambers 14 via the fuel injectors 13 may be returned to the fuel tank 12 via a return line 26.

Each fuel injector 13 is operable to inject fuel into a combustion chamber 14 defined by a cylinder 15. A piston 16 is operable to reciprocate within each cylinder 15. Although the present disclosure illustrates six mixed-mode fuel injector 13 operable to inject into six combustion chamber 14, those skilled in the art will appreciate that the present disclosure could apply to exhaust after-treatment system 10 including any number of fuel injectors and combustion chambers, including only one mixed-mode fuel injector operable to inject fuel into one combustion chamber.

Those skilled in the art will appreciate that in a typical four-stroke cycle, each piston 16 will retract, drawing air into each combustion chamber 14 during an intake stroke. As the piston 16 advances during a compression stroke, the piston 16 will compress the air within each cylinder 15. Generally, each fuel injector 13 will inject fuel at least once during the compression stroke. When the piston 13 nears top dead center of the compression stroke, a combustible environment within the chamber 14 will be created. The fuel will combust near top dead center of the compression stroke. The power from combustion of the fuel will cause the piston 13 to retract during an expansion stroke. As the piston 13 moves away from top dead center during the expansion stroke, each combustion chamber 14 will return to a non-combustible environment. Each piston 16 will again advance during the exhaust stroke, pushing the exhaust from each combustion chamber 14 via an open exhaust valve 27. Although the present disclosure is being discussed for a four-stroke engine, it should be appreciated that the present disclosure contemplates use with a two-stroke engine.

Figure 3:
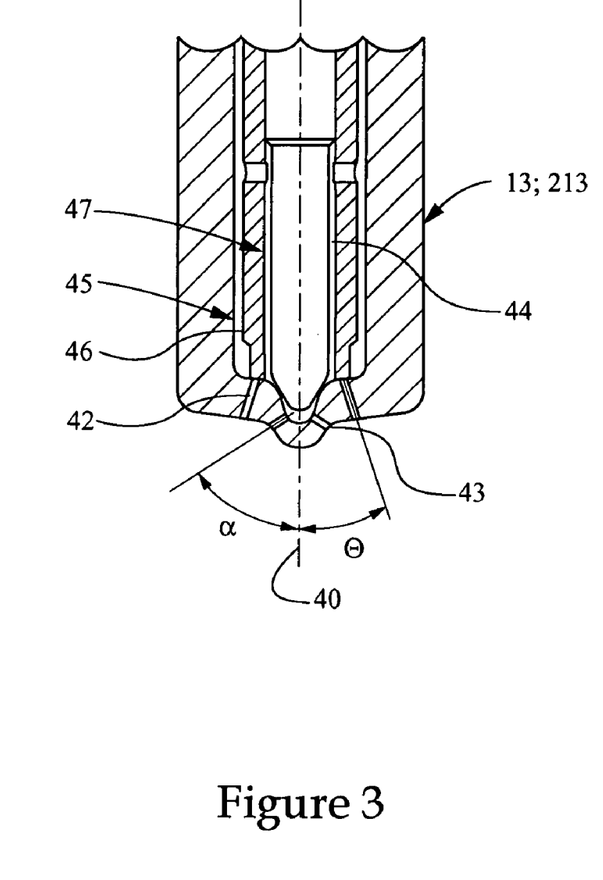
FIG. 3 is an enlarged sectioned side diagrammatic view of a tip portion of a fuel injector within the exhaust after-treatment system of FIGS. 1 and 2.
Figure 5:
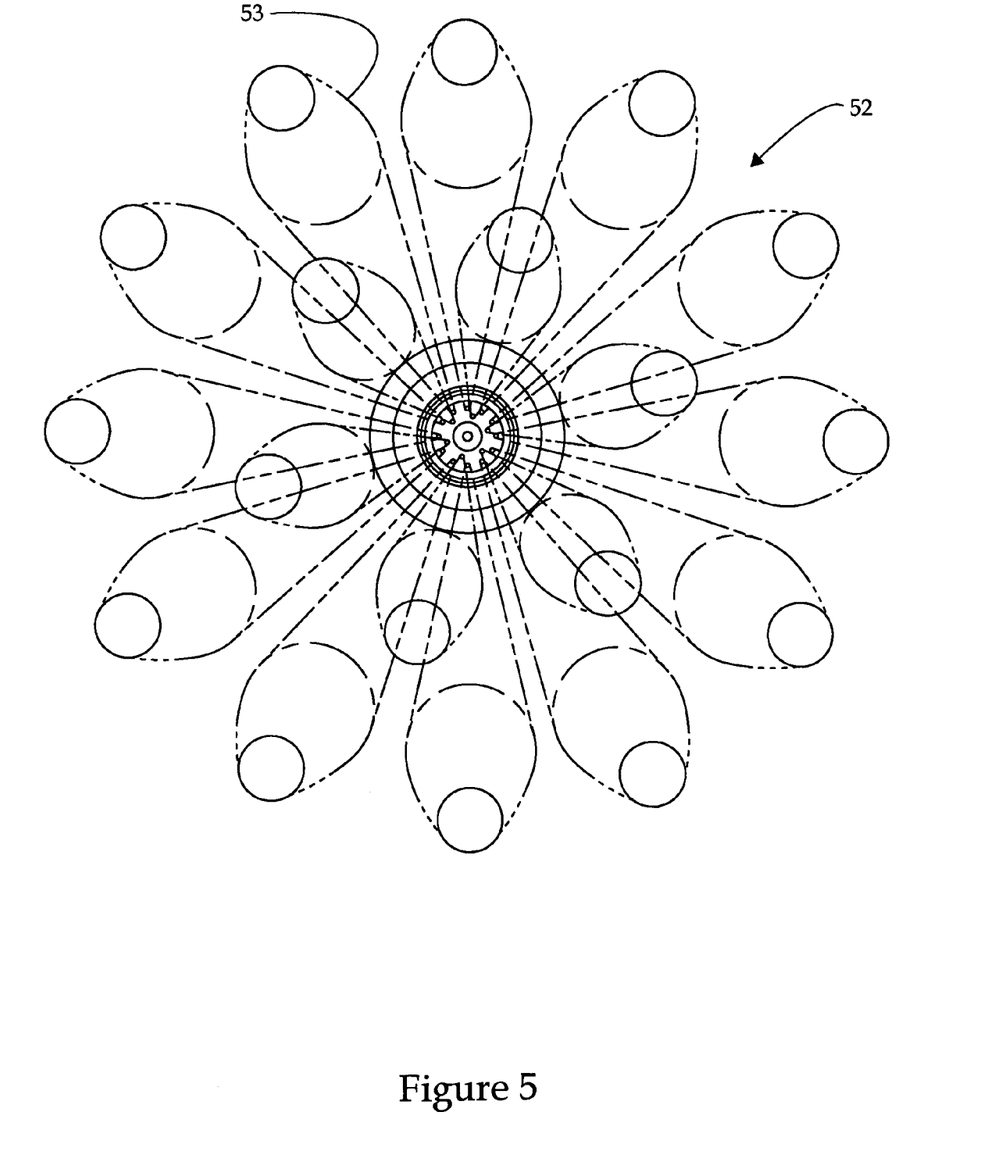
FIG. 5 is a bottom view of a first spray pattern from the fuel injector of FIG. 3.

The mixed-mode fuel injectors 13 are operable to inject fuel into the combustion chambers 14 in a first spray pattern 52 with a small average angle relative to a centerline 40 of the combustion chamber 14 (showerhead pattern as shown in FIG. 5) and a second spray pattern with a large average angle relative to the centerline 40 of the combustion chamber 14 (shown in FIG. 3). The first spray pattern 52 created by the mixed-mode fuel injector 13 is referred to as either a semi-homogeneous or homogeneous charge spray pattern because the fuel generally injected in the first spray pattern is injected during non-auto ignition conditions. Thus, the fuel has time to mix with air before igniting. The first spray pattern 52 is generally used when the engine piston 16 is relatively low in the combustion chamber 14. The second spray pattern is referred to as a conventional spray pattern because the fuel generally is injected during auto-ignition conditions within the combustion chamber 14. Thus, second spray pattern is generally used when the engine piston 16 is relatively high in the combustion chamber 14. Each fuel injector 13 is in communication with an electronic control 20 via an injector communication line 21, and can be separately controlled by the electronic control module 20.

Each combustion chamber 14 is fluidly connected to an exhaust passage 17 via an exhaust manifold 18. Although the first and second embodiments of the present disclosure are illustrated as including one exhaust manifold 18 fluidly connected to each combustion chamber 14, the present disclosure contemplates the combustion chambers being divided into groups, one of which is connected to one exhaust manifold and another being connected to a second exhaust manifold. At least one exhaust after treatment device is positioned within the exhaust passage 17. According to the first embodiment, the exhaust after treatment device includes a NOx adsorber 19. It should be appreciated that the NOx adsorber 19 could be used in conjunction with other exhaust after treatment devices positioned within the exhaust passage 17, including, but not limited to, oxidation catalysts, three-way catalysts, and particulate traps. Those skilled in the art will appreciate that the NOx adsorber 19 includes a catalyst that operates in two phases in order to control undesirable emissions. During a NOx storage phase, NOx within a reductant-lean exhaust produced from normal engine operations is oxidized and stored on the NOx adsorber 19. Generally, the storage phase can last approximately thirty seconds to ten minutes. During a regeneration phase, the stored NOx is removed from the NOx adsorber 19 and converted into harmless gases via a reductant-rich exhaust. Those skilled in the art will appreciate that reductant-rich exhaust is exhaust in which lambda is less than one, and reductant-lean exhaust is exhaust in which lambda is greater than one. Lambda is the air to fuel ratio divided by stoichiometric air-to-fuel ratio. The regeneration phase of the NOx adsorber 19 using the reductant-rich exhaust generally lasts between one to fifteen seconds.

The electronic control module 20 is in communication with at least one regeneration condition indicator sensor 22 via a sensor communication line 23. In the illustrated embodiment, the regeneration condition indicator sensor 22 is positioned at any point within the exhaust passage 17 at which the sensor 22 can sense the concentrations of certain compounds, including, but not limited to, oxygen, within the exhaust downstream from the NOx adsorber 19. In the illustrated embodiment, the regeneration condition indicator sensor 19 is a commercially available monolithic NOx sensor that can sense and provide separate signals for various compounds, including the oxygen concentration and the NOx concentration.

According to the first embodiment, an article 28 includes a computer readable storage medium on which a regeneration algorithm is stored. The article 28 includes the electronic control module 20. The regeneration algorithm is operable to signal each fuel injector 13 to inject an additional amount of fuel in the first spray pattern 52 during at least one of the expansion stroke and the exhaust stroke of at least one engine cycle within the regeneration phase of the NOx adsorber 19. Because the additional amount of fuel is being injected during the exhaust or expansion stroke, the combustion chamber 14 is in a non-combustible environment and the additional amount of fuel will be unburnt when moved into the exhaust passage 17. The unburnt fuel will create the reductant-rich conditions needed for regeneration of the NOx adsorber 19. The regeneration algorithm includes a determining algorithm operable to determine when the regeneration phase of the NOx adsorber 19 begins and ends. Although the determining algorithm is preferably in communication with the NOx sensor 22 and is part of a closed loop control system, the present disclosure contemplates various systems for determining the beginning and end of the regeneration phase, including, but not limited to, a predetermined regeneration phase duration time and storage time. In the preferred embodiment, the determining algorithm determines the end of the regeneration phase based on the concentrations of oxygen and/or NOx downstream from the NOx adsorber 19. For instance, when regeneration is completed, lambda, being the air to fuel ratio divided by stoichiometric air-to-fuel ratio, will fall below lambda upstream from the NOx adsorber 19. The determining algorithm also determines the beginning of the regeneration phase based on the concentration of NOx. When the NOx sensor 22 senses a NOx slip, the determining algorithm can determine the beginning of regeneration.

The regeneration algorithm also preferably includes a minimum delivery algorithm that is operable to divide the additional amount of fuel among less than all of the plurality of mixed-mode fuel injectors 13. The additional amount of fuel is a predetermined amount of fuel for regeneration of the NOx adsorber 19. Those skilled in the art will appreciate that the predetermined amount needed to create reductant-rich exhaust conditions for regeneration will vary depending on engine operating conditions, such as load and speed. Generally, the additional amount of fuel injected for regeneration of the NOx adsorber 19 is divided in equal amounts among the mixed-mode fuel injectors 13. However, when the minimum delivery algorithm determines that the amount of fuel needed to create the reductant-rich exhaust conditions desirable for regeneration is less than a minimum controllable delivery of fuel from the plurality of fuel injectors 13, the algorithm will signal less than all of the plurality of fuel injectors 13 to inject the additional amount of fuel. A rolling cylinder strategy, in which the fuel injectors injecting the additional amount of fuel is alternate between engine cycles, could be used. The minimum delivery algorithm prevents injecting unneeded fuel and/or uncertain amounts of fuel into the exhaust.

Figure 2:
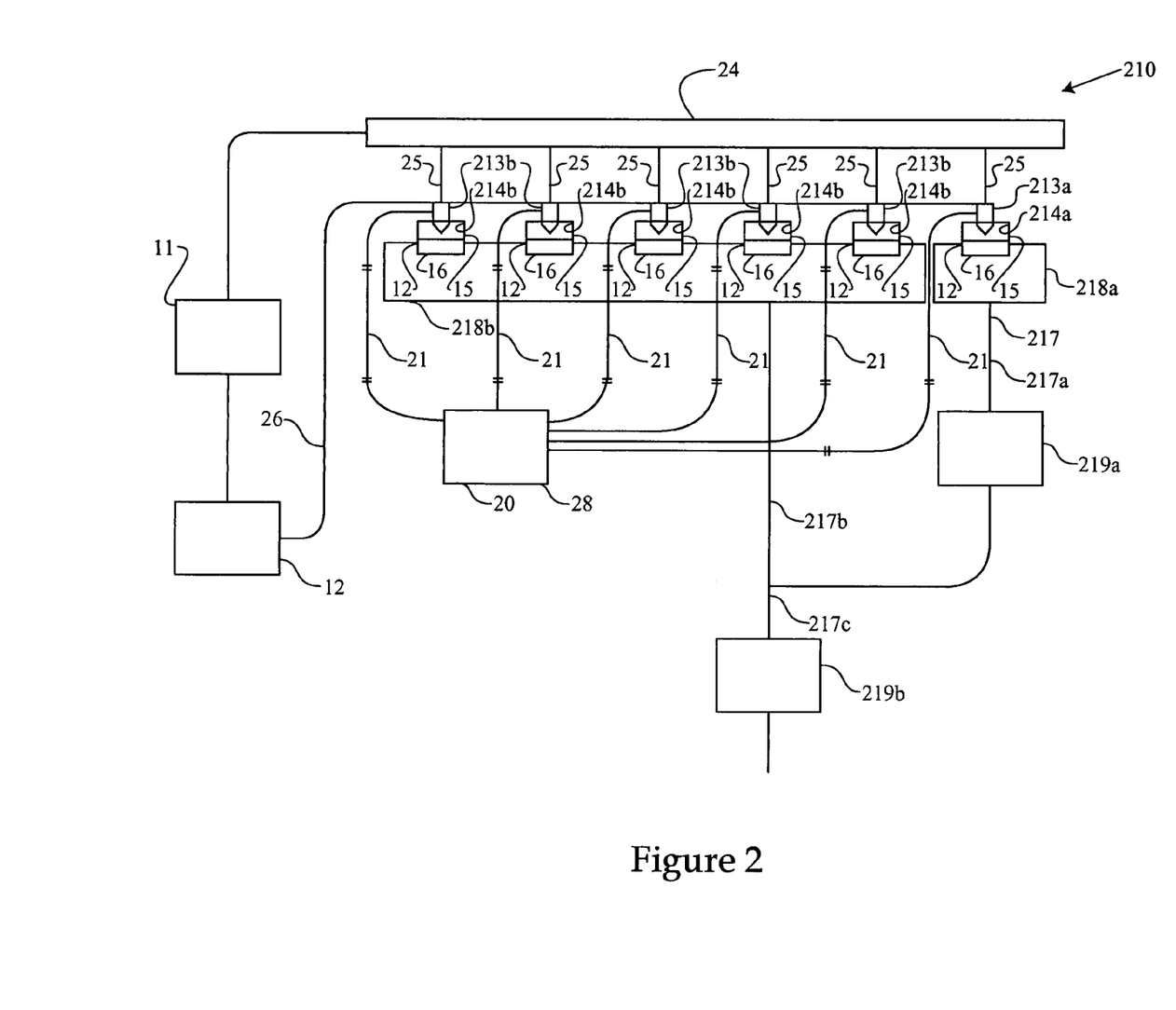
FIG. 2 is a schematic representation of an exhaust after-treatment system, according to a third embodiment of the present disclosure.

Referring still to FIG. 2, the exhaust after-treatment device regeneration system 110 is similar to the exhaust after treatment device regeneration system 10 except that the exhaust after treatment device includes a particulate trap 119 rather than a NOx adsorber 19. The particulate trap 119 traps the particulate matter discharged from the combustion chambers 14. The particulate trap 119 includes a filter that traps the particulate matter at normal exhaust gas temperatures. If the temperature exhaust gas is increased, the particulate matter of which a main component is carbon will burn and be discharged as carbon dioxide. The particulate trap 119 includes a catalyst, often referred to as a diesel oxidation catalyst, that can be positioned upstream from the particulate trap 119 or included within the particulate trap 119. When rich exhaust passes over the diesel oxidation catalyst, an exo-thermal chemical reaction increases the temperature of the exhaust, which will burn the particulate. For purposes of this discussion, the burning of the particulate matter will be referred to as the regeneration of the particulate trap 119.

The electronic control module 20 includes a regeneration algorithm operable to signal the mixed-mode fuel injectors 13 to inject an additional amount of fuel in the first spray pattern 52 during at least one of the expansion stroke and the exhaust stroke of at least one engine cycle within the regeneration phase of the particulate trap 119. The additional amount of fuel is a predetermined amount of fuel for regeneration of the particulate trap 119. Those skilled in the art will appreciate that the predetermined amount required to create the exhaust temperatures and exhaust conditions necessary for regeneration may vary depending on the engine operating conditions, such as engine speed and load.

Those skilled in the art will also appreciate that that additional amount of fuel will be passed over the diesel oxidation catalyst in order to increase the temperature of the exhaust. Although the present disclosure contemplates various methods of beginning and ended regeneration, such as predetermined storage and regeneration phase duration, the regeneration algorithm preferably includes a determining algorithm operable to determine the beginning and end of regeneration of the particulate trap 119. The electronic control module 20 is in communication with at least one regeneration condition indicator sensor 122 within the exhaust passage 17 via a sensor communication line 123. The regeneration condition indicator sensor 122 can sense a regeneration condition indicator within the exhaust passage 17. In the illustrated embodiment, the sensor 122 is a pressure sensor that can sense exhaust pressure upstream from the particulate trap 119. Those skilled in the art will appreciate that as the particulate trap fills with particulate matter, the exhaust flow through the particulate trap 119 is limited, thus increasing the exhaust pressure upstream from the particulate trap 119. If the pressure exceeds a predetermined exhaust pressure for the engine operating conditions, the determining algorithm can determine that regeneration should begin. If the pressure falls below a predetermined minimum exhaust pressure during regeneration for the engine operating conditions, the determining algorithm can determine that regeneration should end.

Similar to the first embodiment, the regeneration algorithm includes a minimum delivery algorithm operable to divide the additional amount of fuel among less than all of the plurality of mixed-mode fuel injectors 13. If the minimum delivery algorithm determines that the additional amount of fuel needed to create the exhaust temperature and conditions for regeneration of the particulate trap 119 is less than a minimum controllable delivery of the plurality of fuel injectors 13, the minimum delivery algorithm will signal only a portion of the fuel injectors 13 to inject fuel in order to achieve the additional total amount of fuel for regeneration. The minimum delivery algorithm reduces the risk of injecting excess fuel not needed and/or injecting uncertain amounts of fuel.

Referring to FIG. 2, there is shown a schematic representation of an exhaust after-treatment system 210, according to a third embodiment of the present disclosure. A first exhaust manifold 218a fluidly connects one of the combustion chambers, referred to as a first combustion chamber 14a, with a first section 17a of the exhaust passage 17. A second exhaust manifold 218b fluidly connects a second portion of the combustion chambers 14b, illustrated as five combustion chambers, with a second section 17b of the exhaust passage 17. The first and second sections 17a and 17b of the exhaust passage 17 merge to form a merged section 17c of the exhaust passage 17. It should be appreciated that any number of combustion chambers could be fluidly connected to the first exhaust manifold and the second exhaust manifold depending on the desired power output and other known considerations. The plurality of fuel injectors 213 are divided into a first group, being a first fuel injector 213a operable to inject fuel into the first combustion chamber 214a, and a second group 214b operable to inject fuel into the second group of combustion chambers 214b.

Similar to the first two embodiments, an exhaust after-treatment device is positioned within the exhaust passage 17. However, the exhaust after treatment device includes a NOx selective catalyst 219b used in conjunction with an ammonia-producing catalyst 219a. The ammonia-producing catalyst 219a is positioned within the first section 17a of the exhaust passage 17, and the NOx selective catalyst 219b is positioned within the merged section 17c of the exhaust passage 17. The ammonia-producing catalyst 219a produces ammonia by a reaction between NOx and other substances in the exhaust-gas stream from the first combustion chamber 14a. For example, NOx may react with a variety of other combustion byproducts to produce ammonia. These other combustion byproducts may include, for example, $H_2$ (hydrogen gas), $C_3H_6$ (propane), or CO (carbon monoxide).

The ammonia-producing catalyst 17 may be made from a variety of materials. In one embodiment, ammonia-producing catalyst 17 may include at least one of platinum, palladium, rhodium, iridium, copper, chrome, vanadium, titanium, iron, or cesium. Combinations of these materials may be used, and the catalyst material may be chosen based on the type of fuel used, the air to fuel-vapor ratio desired, or for conformity with environmental standards, or other considerations known in the art. The NOx selective catalyst 219b facilitates a reactions between ammonia and NOx to at least partially remove NOx from the exhaust-gas stream in the merged portion 18c of the second section 18b. For example, the NOx selective catalyst 19 may facilitate a reaction between ammonia and NOx to produce nitrogen gas and water, among other reaction products. It should be appreciated that NOx selective catalyst 219b could be used with other exhaust after-treatment devices, including, but not limited to, a particulate trap being positioned downstream from the NOx selective catalyst 219b.

According to the third embodiment, the electronic control module 20 includes a late injection algorithm operable to signal the first fuel injector to inject an amount of fuel into the non-combustible environment within the first combustion chamber 14a during at least one of the expansion stroke and the exhaust stroke. The unburnt fuel will be pushed into the first section 17a of the exhaust passage 17 where it will create reductant-rich exhaust conditions needed to effectively convert NOx within the exhaust to ammonia that will be passed over the NOx selective catalyst 219b downstream. The fuel might also be injected during the compression stroke if the engine has variable valve opening capabilities, such as ability to open the exhaust valve during at least a portion of the compression stroke.

Referring to FIG. 3, there is shown an enlarged sectioned side diagrammatic view of a tip portion of the mixed-mode fuel injector 13 and 213 of FIGS. 1 and 2, according to all embodiments of the present disclosure. The first nozzle outlet set 42 of the mixed-mode fuel injector 13, 213 is referred to as a semi-homogeneous charge nozzle outlet set with a relatively small average angle theta with respect to the centerline. The first nozzle outlet set 42 are used to inject fuel when the piston 16 is relatively low in the combustion chamber 14, 214 so that the fuel does not immediate ignite within the combustion chamber 14, 214. The second nozzle outlet set 43 is referred to as a conventional nozzle outlet set typical of those in the art and has a relatively large average angle alpha with respect to centerline 40. The second nozzle outlet set 43 is used to inject fuel when the piston 16 is relatively high in the combustion chamber 14, 214 so that the fuel combusts upon injection in a conventional manner. The opening and closing of the second nozzle outlet set 43 and the first nozzle outlet set 42 are controlled by an inner needle valve member 44 of a second direct control needle valve 47 and an outer needle valve member 46 of a first direct control needle valve 45, respectively. The fuel injector 13, 213 has the ability to inject fuel through the first nozzle outlet set 42, second nozzle outlet set 43, or both.

Figure 4:
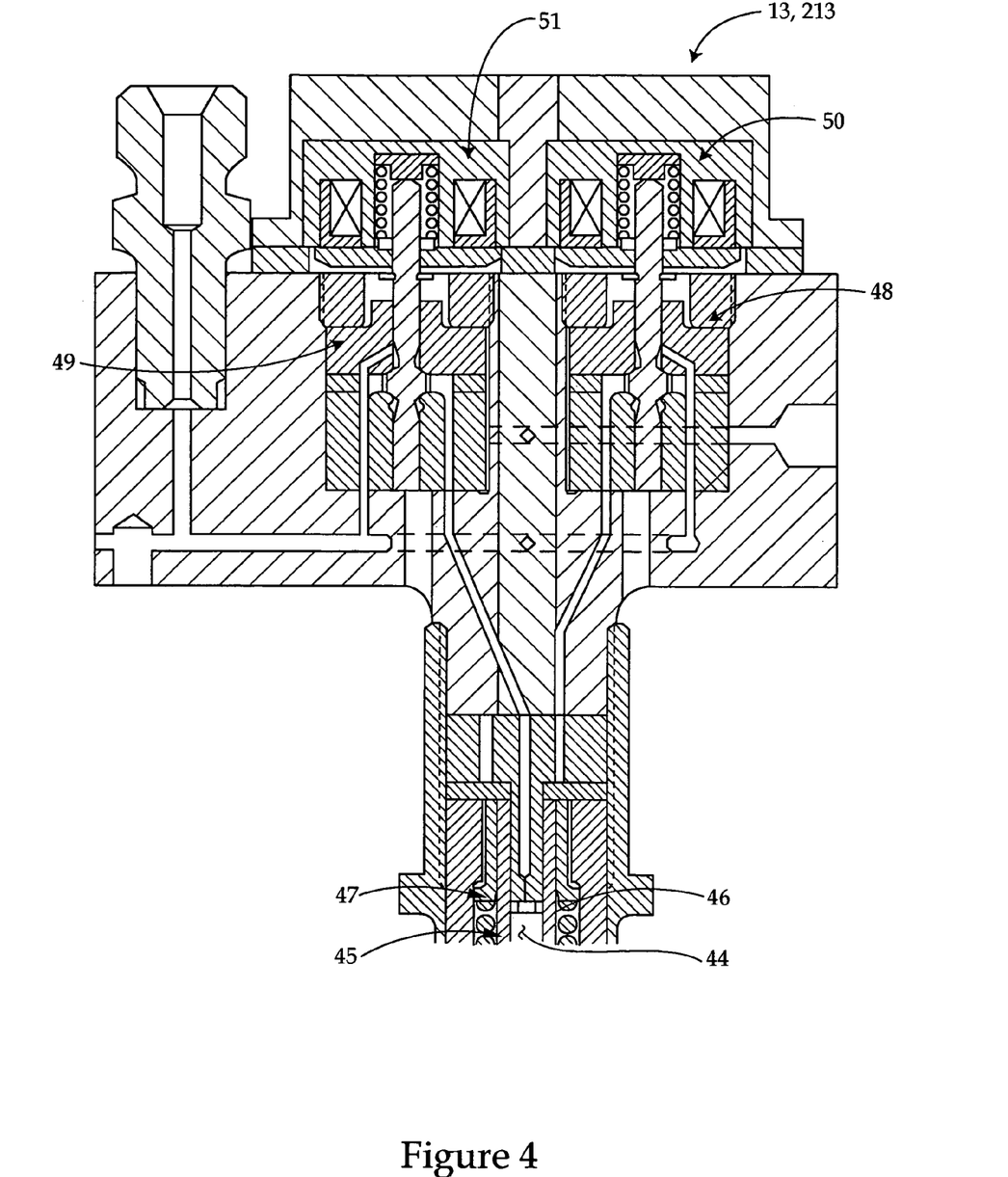
FIG. 4 is a sectioned side diagrammatic view of an upper portion of the fuel injector of FIG. 3.

Referring to FIG. 4, there is shown a sectioned side diagrammatic view of an upper portion of the mixed-mode fuel injector 13, 213 of FIG. 3. A first and second needle control valves 48 and 49 control the positioning of the first and second direct control needle valves 45 and 47, respectively. Both needle control valves 48 and 49 operate in a similar manner and are preferably three way valves that are substantially identical in structure. The first and second needle control valves 48 and 49 are operably coupled to a first and second electrical actuator 50 and 51, respectively. In order to open the first nozzle outlet set 42, the first electrical actuator 50 is energized, and the first needle control valve 48 moves to a position that relieves pressure acting on a closing hydraulic surface of the outer needle valve member 46. The outer needle valve member 46 can be lifted off its seat by high pressure fuel within the injector 20a, and the fuel can be injected through the first nozzle outlet set 42. Similarly, in order to open the second nozzle outlet set 43, the second electrical actuator 51 is energized, moving the second needle control valve 49 to a position that relieves pressure acting on a closing hydraulic surface of the inner needle valve member 44. The inner needle valve member 44 can be lifted off its seat by high pressure fuel within the mixed-mode injector 13, 213 and inject the fuel through the second nozzle outlet set 43. Both the first and second electrical actuators 50 and 51 can be activated in various timings, including simultaneously, to inject fuel in different sequences.

Referring to FIG. 6, there is shown an example first spray pattern 52. The homogeneous charge spray pattern 52 is illustrated to include 18 nonintersecting plumes 53 that are directed downward with an average angle theta, as shown in FIG. 3. Average angle theta is preferably substantially small compared to the average angle alpha of the conventional second spray pattern. In the present disclosure, the injection of the additional amount includes the first spray pattern 52. The injection occurs in at least one of the expansion stroke and the exhaust stroke so that the fuel will not burn within the combustion chamber 14, 214a. Because the injection of the additional amount occurs when the combustion chamber 14, 214 is in non-combustible conditions, the engine piston 16 is relatively far from top dead center. Because the spray pattern includes the relatively small average angle relative to the centerline 40, the fuel spray will be directed generally outward in order to avoid contact with the engine piston 16 and/or cylinder walls.

INDUSTRIAL APPLICABILITY

Referring to FIGS. 1-6, a method of adding unburnt hydrocarbons to exhaust from the combustion chambers 14 will be discussed. The method will first be discussed for the first and second embodiments of the present disclosure including the NOx adsorber 19 and the particulate trap 119, respectively. It should be appreciated that although the operation of the present disclosure will be discussed for one fuel injector 13, the other five fuel injectors 13 operate similarly except where specified. The mixed-mode fuel injector 13 is positioned, at least partially, within the combustion chamber 14. Generally, for purposes of combustion, a first amount of fuel will be injected into the combustion chamber 14. Those skilled in the art will appreciate that the first amount of fuel could be divided into various injections at various timings in order to produce a desired power output and emissions. If an injection with at least a portion of the first amount of fuel occurs when the combustion chamber 14 is in non-auto ignition condition, such as when the engine piston 16 is relatively far from top dead center, the first amount may be injected in the first spray pattern 52 through the first nozzle outlet set 42 to avoid wall wetting. The fuel will have time to, at least partially, mix with the air prior to ignition. If an injection with at least a portion of the first amount occurs when the combustion chamber 14 is in auto-ignition conditions, such as when the engine piston 16 is relatively near top dead center, the fuel amount may be injected in the second spray pattern through the second nozzle outlet set 43, or possibly through both sets of outlets. The second spray pattern with the relatively large average angle with respect to the centerline 40 of the combustion chamber 14 is desirable for conventional combustion. Those skilled in the art will appreciate that there are various injection strategies that can be utilized including first spray patterns 52 and conventional second spray patterns.

If the determining algorithm of the regeneration algorithm determines that the NOx adsorber 19 or the particulate trap 119 need regeneration, the regeneration algorithm will signal the fuel injectors 13 to inject the additional amount of fuel into the non-combustible environment within the combustion chambers 14 when the piston 16 is in at least one of the expansion and exhaust stroke. As the piston 16 retracts during the expansion stroke, the combustion chamber 14 will be in the non-combustible environment, in which the fuel injected will not burn. The additional amount of fuel is the predetermined amount of fuel for regeneration of the NOx adsorber 19 in the first embodiment and the particulate trap 119 in the second embodiment. In both embodiments, the predetermined amount may vary based on engine speed, injection duration (i.e. load), and air flow. Generally, the additional amount of fuel will be divided among all of the fuel injectors 13. However, if the minimum delivery algorithm determines that the additional amount of fuel is less than the minimum delivery of the plurality of fuel injectors 13, the additional amount of fuel will be divided among less than all of the fuel injectors 13. For instance, a rolling cylinder strategy can be used. For instance, three fuel injectors within the plurality could inject the additional amount of fuel, and in the next engine cycle, the three other fuel injectors could inject the additional amount of fuel. In all embodiments, the exhaust with the additional amount of unburnt fuel is moved into the exhaust passage 17 via the open exhaust valve 27. According to the first embodiment, the NOx adsorber 19 is regenerated by passing the exhaust with the unburnt fuel over the NOx adsorber 19 during the regeneration phase of the NOx adsorber 19. According to the second embodiment, the exhaust with the unburnt fuel is passed over the diesel oxidation catalyst of the particulate trap 119 in order to increase the exhaust temperature. The heated exhaust is passed through the particulate filter during the regeneration phase. Thus, the unburnt fuel provides the reductant-rich exhaust and the means to achieve elevated temperatures needed for regeneration.

In order to determine the beginning and end of the regeneration phase in the first embodiment, the NOx sensor 22 will preferably sense both the oxygen and the NOx concentrations in the exhaust downstream from the NOx adsorber 19. The sensed concentrations will be communicated to the determining algorithm within the electronic control module 20. When the NOx sensor 22 senses a NOx slip, regeneration will begin and the regeneration algorithm will signal the fuel injectors 13 to inject the additional amount of fuel. Although the determining algorithm can determine the end of the regeneration phase in any conventional manner, in the illustrated embodiment, the end of regeneration will be signaled when downstream lambda falls below lambda upstream from the NOx adsorber 19. The fuel injectors 13 will inject only the first amount of fuel for combustion during the storage phase of the NOx adsorber 19.

In order to determine the beginning and the end of the regeneration phase of the particulate trap 119, the pressure exhaust sensor 122 will sense the pressure of the exhaust upstream from the particulate trap 119 and communicate such to the determining algorithm within the electronic control module 20. If the pressure within the exhaust passage 17 exceeds the predetermined pressure for the sensed engine operating conditions, the regeneration algorithm will signal the fuel injectors 13 to inject the additional amount of fuel into the combustion chambers 14 during either the expansion stroke or the exhaust stroke. If the pressure within the exhaust passage falls below the predetermined pressure for the engine operating conditions during the regeneration phase, the regeneration algorithm will cease signaling the fuel injectors 13 to inject the additional amount. The fuel injectors 13 will inject only the first amount for combustion during the storage phase of the particulate trap 119.

Referring to FIGS. 2-5, according to the third embodiment of the present disclosure, the additional amount of fuel is injected in the first spray pattern 52 into the non-combustible environment within the combustion chamber 214a during the expansion stroke or the exhaust stroke. Although the additional amount of fuel could be divided among more than one fuel injector, preferably only the fuel injector 213a injects the additional amount of fuel. Further, the additional amount of fuel is preferably injected in each engine cycle rather than periodically as is done in the first and second embodiments. The exhaust with the unburnt additional amount of fuel is passed over the ammonia-producing catalyst 219a positioned within the first section 217a of the exhaust passage 217 in order to convert NOx within the exhaust to ammonia. The ammonia is then combined with the exhaust from the second portion of combustion chambers 214b in the merged portion 217c of the exhaust passage 217. The ammonia and the exhaust from the second portion 214b are passed over the NOx selective catalyst 219b to convert the NOx to nitrogen and water. Those skilled in the art will appreciate that if the first combustion chamber 214a produces a different amount of power than each of the other combustion chambers 214b, vibrations caused by the uneven power output distribution can be reduced by matching stroke cycles of more than one cylinder such that two cylinders operate as one, or by other strategies known in the art.

The exhaust after-treatment system of the present disclosure is advantageous because it creates reductant-rich exhaust conditions and elevated temperatures needed for regeneration of exhaust after-treatment devices, such as NOx adsorbers and particulate traps, or for the production of ammonia for use with NOx selective catalysts. The rich exhaust conditions are created without the use of additional fuel injectors injecting fuel within the exhaust passages, thereby reducing the cost of the exhaust after-treatment system. The mixed-mode fuel injectors 13, 213 can inject fuel late in the engine cycle without spraying fuel in the conventional spray pattern that may result in wetting of the cylinder walls. Because there is less or no spraying of the cylinder walls, the risk of oil dilution and the mechanical problems associated from oil dilution are greatly reduced.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A method of adding unburnt hydrocarbons to exhaust from at least one combustion chamber, comprising the steps of:

positioning a mixed-mode fuel injector operable to inject fuel into a combustion chamber in a first spray pattern with a small average angle relative to a centerline of the combustion chamber and a second spray pattern with a large average angle relative to the centerline of the combustion chamber;

injecting an amount of fuel in the first spray pattern into a non-combustible environment within the at least one combustion chamber during at least one of an expansion stroke and exhaust stroke;

moving exhaust with the unburnt amount of fuel into an exhaust passage via an exhaust valve;

injecting, for combustion, a first amount of fuel in the first spray pattern when the at least one combustion chamber is in a non-auto ignition condition; and a step of injecting, for combustion, the first amount of fuel in the second spray pattern when the at least one combustion chamber is in an auto-ignition condition.

2. The method of claim 1 including a step of regenerating an exhaust after treatment device, at least in part, by passing the exhaust with the unburnt fuel over the exhaust after treatment device.

3. The method of claim 2 wherein the exhaust after treatment device includes a NOx adsorber.

4. The method of claim 2 wherein the exhaust after treatment device includes a particulate trap.

5. The method of claim 2 wherein the step of regenerating includes a step of sensing at least one regeneration condition indicator within the exhaust passage.

6. The method of claim 1 including a step of converting NOx to ammonia, at least in part, by passing at least a portion of the exhaust with the unburnt additional amount of fuel over an ammonia-producing catalyst.

7. The method of claim 1 wherein the step of regenerating includes a step of sensing when at least one regeneration condition indicator within the exhaust passage; and a step of regenerating an exhaust after treatment device, at least in part, by passing the exhaust with the unburnt additional amount of fuel over the exhaust after treatment device.

8. The method of claim 7 wherein the exhaust aftertreatment device includes a NOx adsorber.

9. The method of claim 7 wherein the exhaust aftertreatment device includes a particulate trap.

* * * * *